US009386319B2

(12) United States Patent
Zhu et al.

(10) Patent No.: US 9,386,319 B2
(45) Date of Patent: Jul. 5, 2016

(54) POST-PROCESS FILTER FOR DECOMPRESSED SCREEN CONTENT

(71) Applicant: Microsoft Technology Licensing, LLC, Redmond, WA (US)

(72) Inventors: Lihua Zhu, San Jose, CA (US); Sridhar Sankuratri, Campbell, CA (US); Arjun Dube, Redwood City, CA (US); B. Anil Kumar, Saratoga, CA (US); Nadim Abdo, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 71 days.

(21) Appl. No.: 14/019,436

(22) Filed: Sep. 5, 2013

(65) Prior Publication Data

US 2015/0063471 A1    Mar. 5, 2015

(51) Int. Cl.
*G06K 9/36* (2006.01)
*H04N 19/44* (2014.01)
*G06F 3/14* (2006.01)
(Continued)

(52) U.S. Cl.
CPC .............. *H04N 19/44* (2014.11); *G06F 3/1454* (2013.01); *G06T 9/00* (2013.01); *H04N 19/117* (2014.11); *H04N 19/136* (2014.11); *H04N 19/167* (2014.11); *H04N 19/17* (2014.11); *H04N 19/182* (2014.11); *H04N 19/27* (2014.11); *H04N 19/86* (2014.11); *G09G 2340/02* (2013.01); *G09G 2350/00* (2013.01)

(58) Field of Classification Search
CPC ................ G06K 2215/0071; H04N 19/00909; H04N 19/00533; H04N 19/117; H04N 19/12; H04N 19/124; H04N 19/126; H04N 19/13; H04N 19/136; H04N 19/139; H04N 19/14; H04N 19/157; H04N 19/159; H04N 19/17; H04N 19/176; H04N 19/30; H04N 19/423; H04N 19/44; H04N 19/46; H04N 19/60; H04N 19/61; H04N 19/80; H04N 19/81; H04N 19/86; H04N 21/41407; H04N 21/4143; G06F 3/1415; G06F 3/1454; G06F 2212/455; G06T 5/002; G06T 9/00; G06T 9/004; G06T 2207/10016; G06T 2207/20192; G09G 51/39; G09G 2320/103; G09G 2320/106; G09G 2340/02; H03M 13/3761; H04L 1/0009; H04L 1/0014; H04L 1/0057; H04L 65/607
See application file for complete search history.

(56) References Cited

U.S. PATENT DOCUMENTS 5,850,484 A * 12/1998 Beretta et al. ................. 382/250
6,539,060 B1    3/2003 Lee et al.
(Continued)

OTHER PUBLICATIONS

International Search Report and Written Opinion for Application No. PCT/US2014/053622 mailed Nov. 7, 2014.
(Continued)

*Primary Examiner* — Jose Couso
(74) *Attorney, Agent, or Firm* — Kate Drakos; Micky Minhas

(57) ABSTRACT

Methods and systems for processing graphical data received at a computing system from a remote source are described. One method includes decoding received graphical content, the received graphical content including an image being compressed using a plurality of codecs, wherein decoding the received graphical content includes creating a decoded image. The method also includes, based on quality of the received graphical content, selecting from among a plurality of filters to apply to the decoded image. The method further includes applying a plurality of filters to at least a portion of the decoded image.

18 Claims, 13 Drawing Sheets

(51) Int. Cl.
  *H04N 19/117* (2014.01)
  *H04N 19/86* (2014.01)
  *G06T 9/00* (2006.01)
  *H04N 19/136* (2014.01)
  *H04N 19/182* (2014.01)
  *H04N 19/17* (2014.01)
  *H04N 19/167* (2014.01)
  *H04N 19/27* (2014.01)

(56) References Cited

U.S. PATENT DOCUMENTS

| | | |
|---|---|---|
| 7,054,500 B1 | 5/2006 | Lillevold |
| 7,747,086 B1 | 6/2010 | Hobbs et al. |
| 7,792,194 B2 | 9/2010 | Zhong et al. |
| 8,311,091 B1 | 11/2012 | Lin et al. |
| 8,442,311 B1 | 5/2013 | Hobbs et al. |
| 8,964,833 B2 * | 2/2015 | Auwera et al. ........... 375/240.03 |
| 2011/0078532 A1 | 3/2011 | Vonog et al. |
| 2013/0022107 A1 | 1/2013 | Van der Auwera et al. |

OTHER PUBLICATIONS

Pawate et al., "Remote Display Technology Enhances the Cloud's User Experience", In White Paper of Texas Instruments, 13 pages (Aug. 2012).

Sun et al., "Real-Time Screen Image Scaling and its GPU Acceleration", In Proceedings of the International Conference on Image Processing, pp. 3285-3288 (Nov. 7, 2009).

VMware View™ 5 with PCoIP Network Optimization Guide, Technical Paper by VMware, Inc., 37 pages (Oct. 7, 2011).

Zhao et al., "Content Adaptive Image De-blocking", In IEEE International Symposium on Consumer Electronics, pp. 299-304 (Sep. 2004).

"International Preliminary Report on Patentability Issued in PCT Application No. PCT/US2014/053622", Mailed Date: Oct. 1, 2015, 16 Pages.

* cited by examiner

POST-PROCESS FILTER FOR DECOMPRESSED SCREEN CONTENT

BACKGROUND

Screen content, or data describing information displayed to a user by a computing system on a display, generally includes a number of different types of content. These can include, for example, text content, video content, static images (e.g., displays of windows or other GUI elements), and slides or other presentation materials. Increasingly, screen content is delivered remotely, for example so that two or more remote computing systems can share a common display, allowing two remotely-located individuals to view the same screen simultaneously, or otherwise in a teleconference such that a screen is shared among multiple individuals. Because screen content is delivered remotely, and due to increasing screen resolutions, it is desirable to compress this content to a size below its native bitmap size, to conserve bandwidth and improve efficiency in transmission.

Although a number of compression solutions exist for graphical data such as screen content, these compression solutions are inadequate for use with variable screen content. For example, traditional Moving Picture Experts Group (MPEG) codecs provide satisfactory compression for video content, since the compression solutions rely on differences between sequential frames. Furthermore, many devices have integrated MPEG decoders that can efficiently decode such encoded data. However, MPEG encoding does not provide substantial data compression for non-video content that may nevertheless change over time, and therefore is not typically used for screen content, in particular for remote screen display.

To address the above issues, a mix of codecs might be used for remote delivery of graphical data. For example, text data may use a lossless codec, while for screen background data or video data, a lossy codec that compresses the data may be used (e.g., MPEG-4 AVC/264). Additionally, in some cases, the lossy compression may be performed on a progressive basis. However, this use of mixed codecs raises issues. For example, there is often a difference in visual quality when comparing portions of screen content that use lossy and lossless codecs. Additionally, in a typical lossy codec, quantization is used to improve compression at a loss to quality. It is common to quantize higher frequency content more than lower frequency content. This results in loss of sharpness and introduction of quantization noise, in the reconstructed image, which translates to visible artifacts in the reconstructed image. This problem is more acute at higher quantization levels or lower bandwidths. In particular, when bandwidth is insufficient, lossy codecs rapidly lose visual quality, in particular progressively updated codecs. This can introduce substantial jitter into the image.

SUMMARY

In summary, the present disclosure relates to filters selectively applied to received graphical content, such as in the context of a remote screen display system. Generally, the present disclosure describes selective application of one or more post-processing filters that can be used at the computing system (e.g., a laptop, tablet, smartphone, or other computing device) to decompressed graphical data, or screen content, thereby improving a quality of a reconstructed image.

In a first aspect, a method for processing graphical data received at a computing system from a remote source is described. The method includes decoding received graphical content, the received graphical content including an image being compressed using a plurality of codecs, wherein decoding the received graphical content includes creating a decoded image. The method also includes, based on quality of the received graphical content, selecting from among a plurality of filters to apply to the decoded image. The method further includes applying a plurality of filters to at least a portion of the decoded image.

In a second aspect, a computing system includes a programmable circuit, a display, and a memory operatively connected to the programmable circuit and storing program instructions which, when executed by the programmable circuit, perform a method of processing graphical data from a remote source for output to the display. The method includes decoding received graphical content, the received graphical content including an image being compressed using a plurality of codecs, wherein decoding the received graphical content includes creating a decoded image. The method also includes, based on quality of the received graphical content, selecting from among a plurality of filters to apply to the decoded image. The method further includes applying one or more filters to at least a portion of the decoded image, the one or more filters including an asymmetric deblocking filter.

In a third aspect, a computer-readable storage medium comprising computer-executable instructions stored thereon is disclosed. When executed, the computer-executable instructions cause a computing system to perform a method of processing graphical data from a remote source for output to the display. The method includes decoding received graphical content, the received graphical content including an image having a plurality of regions, each region categorized as having graphical content selected from among a plurality of content types. Each content type is associated with a different codec from among a plurality of codecs, and decoding the received graphical content includes creating a decoded image. For each region associated with a lossy codec among the plurality of different codecs, the method includes, based on quality of the received graphical content associated with the region, selecting an ordering of one or more filters from among a plurality of filters to apply to the region of the decoded image, and applying the selected ordering of one or more filters to the region.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
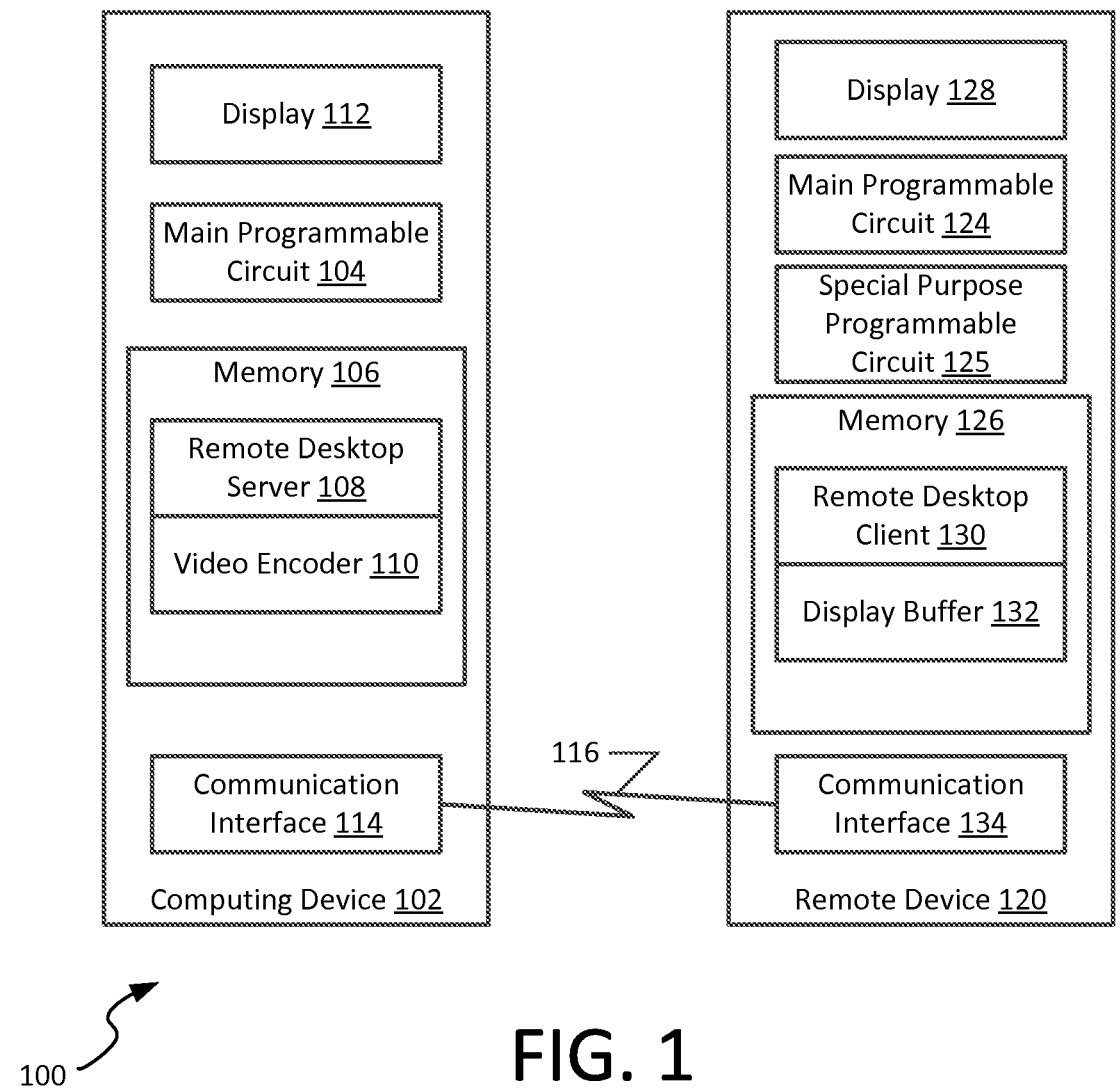
FIG. 1 illustrates an example schematic arrangement of a system in which graphical data received at a computing system from a remote source is processed.

As briefly described above, embodiments of the present disclosure are directed to a filter applied to received graphical content, such as in the context of a remote screen display system. Generally, the present disclosure describes selective application of one or more post-processing filters that can be used at the computing system (e.g., a laptop, tablet, smartphone, or other computing device) to decompressed graphical data, or screen content, thereby improving the quality of a reconstructed image. Using these filters, an improved perceived quality can be obtained at the same bandwidth, or alternatively, the same perceived quality can be obtained at a lower bandwidth.

To address some limitations in remote screen display systems, the Remote Desktop Protocol (RDP) was developed by MICROSOFT® Corporation of Redmond, Wash. In this protocol, a screen frame is analyzed, with different contents classified differently. When RDP is used, a mixed collection of codecs can be applied, based on the type of screen content that is to be compressed and transmitted to a remote system for subsequent reconstruction and display. For example, text portions of a screen can use a lossless codec, while image and background data use a progressive codec for gradually improving screen quality, or optionally, MPEG-4 AVC/264. Video portions of the screen content are encoded using a video codec, such as MPEG-4 AVC/264. Generally, the progressive and video codecs are lossy, while the codec used for text is lossless.

Differences in visual quality appear in low- to mid-bandwidth situations, when comparing regions encoded and decoded using lossy and lossless codecs. For example, regions encoded and decoded using lossy codecs may exhibit a lower quality as compared to regions encoded using lossless codecs. To address such differences, in accordance with the present disclosure one or more post-processing filters can be applied to all or select portions of the screen content, thereby improving an overall quality and uniformness of quality of the screen content. As compared to prior solutions, which are limited to deblocking techniques applied specifically to video content, the present disclosure addresses visual artifacts that may be created when mixed content (e.g., some combination of video, image, and/or text) is considered.

In accordance with some embodiments of the present disclosure, a decoded image included in screen content received from a decoder (or a plurality of decoders) is processed by a set of one or more filters, for example to remove noise, recover graphical features, and improve perceived quality of the screen content. In various applications, an asymmetric deblocking filter, a bilateral filter, and/or a peaking filter can be used. The filters can be selected differently and/or applied in differing orders, for example based on the amount of compression of the decoded image. In some embodiments, one or more filters can also be applied to a captured image before that image is encoded by the remote system from which the screen content is received.

FIG. 1 illustrates an example schematic arrangement of a system 100 in which remote screen content distribution can be performed, and in which post-processing of screen content is provided. As illustrated, the system 100 includes a computing device 102, which includes a programmable circuit 104, such as a CPU. The computing device 102 further includes a memory 106 configured to store computing instructions that are executable by the programmable circuit 104. Example types of computing systems suitable for use as computing device 102 are discussed below in connection with FIGS. 12-14.

Generally, the memory 106 includes a remote desktop protocol software 108 and a video encoder 110. The remote desktop protocol software 108 generally is configured to replicate screen content presented on a local display 112 of the computing device 102 on a remote computing device, illustrated as remote device 120. In some embodiments, the remote desktop protocol software 108 generates content compatible with a Remote Desktop Protocol (RDP) defined by Microsoft Corporation of Redmond, Wash.

The video encoder 110 can be configured to apply any of a number of different encoding schemes, or codecs, to content, such that the content is compressed for transmission to the remote device 120. In example embodiments, the video encoder 110 can apply a standards-based codec, such as an MPEG-based codec. In particular examples, the video encoder 110 can be an MPEG encoder employing one or more codecs such as an H.264 codec. Other types of standards-based encoding schemes or codecs could be used as well.

As illustrated in FIG. 1, encoded screen content can be transmitted to a remote device 120 by a communication interface 114 of the computing device 102, which provides the encoded screen content to a communication interface 134 of the remote device 120 via a communicative connection 116 (e.g., the Internet). Generally, and as discussed below, the communicative connection 116 may have unpredictable available bandwidth, for example due to additional traffic occurring on networks forming the communicative connection 116. Accordingly, existing systems that transmit encoded screen content do so using various compression codecs, including a text compression (lossless) codec, a video (lossy) codec, or a progressive (lossy) codec in which an initial transmission of such screen content provides a low-quality (e.g., low resolution) version of that screen content, and which is progressively improved over time (i.e., as the screen remains unchanged and bandwidth remains available).

In the context of the present disclosure, in some embodiments, a remote device 120 includes a main programmable circuit 124, such as a CPU, and a special-purpose programmable circuit 125. In example embodiments, the special-purpose programmable circuit 125 is a standards-based decoder, such as an MPEG decoder designed to encode or decode content having a particular standard (e.g., MPEG-4 AVC/264). In particular embodiments, the remote device 120 corresponds to a client device either local to or remote from the computing device 102, and which acts as a client device useable to receive screen content. Accordingly, from the perspective of the remote device 120, the computing device 102 corresponds to a remote source of graphical (e.g., display) content.

In addition, the remote device includes a memory 126 and a display 128. The memory 126 includes a remote desktop client 130 and display buffer 132. The remote desktop client 130 can be, for example, a software component configured to receive and decode screen content received from the computing device 102. In some embodiments, the remote desktop client 130 is configured to receive and process screen content for presenting a remote screen on the display 128. The screen content may be, in some embodiments, transmitted according to the Remote Desktop Protocol defined by Microsoft Corporation of Redmond, Wash. The display buffer 132 stores in memory a current copy of screen content to be displayed on the display 128, for example as a bitmap in which regions can be selected and replaced when updates are needed.

In some embodiments, and as discussed below, the video encoder 110, or remote desktop protocol software 108, applies one or more filters to the content before that content is encoded for transmission to remote device 120. Additionally, remote device 120 can, via the remote desktop client 130, both decode such content, and apply one or more post-processing filters to that content to improve the observed image quality. Details regarding such filters are discussed further in connection with FIGS. 2-11, below. Generally, application of such filters, including, for example, an asymmetric deblocking filter as discussed herein, allows for improved image quality overall when the graphical content is displayed.

Figure 2:
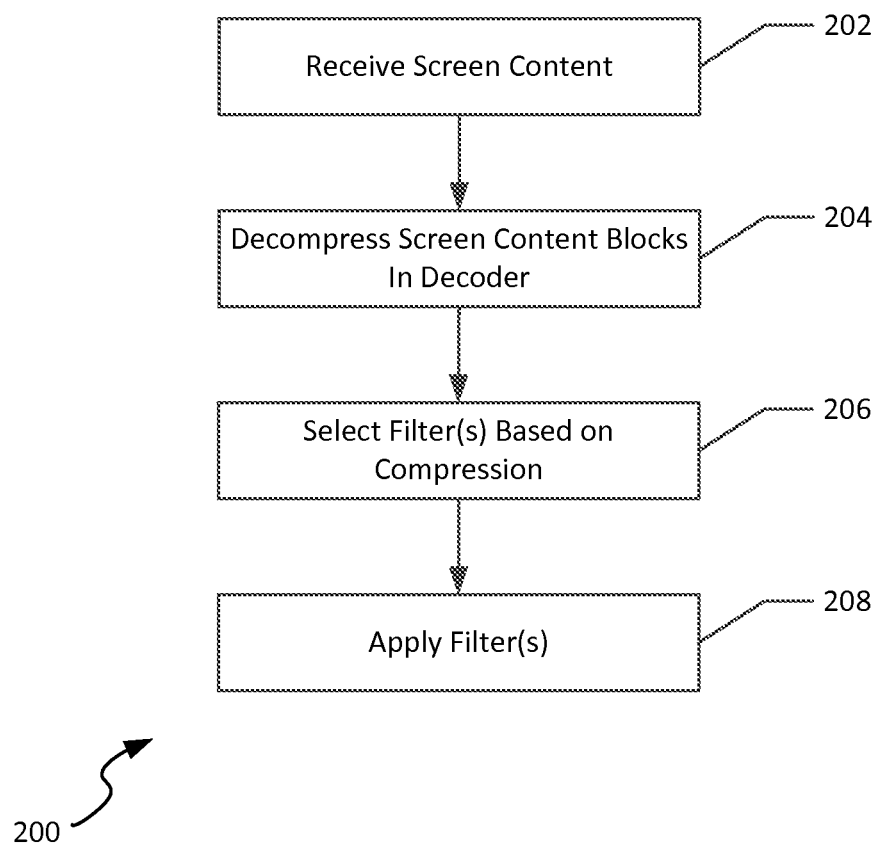
FIG. 2 illustrates a flowchart of a method for processing graphical data, according to an example embodiment.

FIG. 2 illustrates a flowchart of a method 200 for processing graphical data, according to an example embodiment. The method 200 can be performed, for example, by a computing system that receives graphical content, such as the remote device 120 of FIG. 1. In other embodiments, the method 200 can be performed by one or more different computers that collaborate to decode and display graphical content.

In the example shown, operation 202 includes receiving screen content from a remote source. The screen content can include graphical content that is intended to be presented on a display, such as display 128 of remote device 120. In general, because the screen content is received from a remote source, such as computing device 102 of FIG. 1, the screen content is typically compressed in some manner. As discussed above, in some cases the screen content can include many regions of graphical content that are each separately encoded. Each region can be encoded using the same codec, or different codecs. In some cases, a combination of lossy codecs, such as MPEG-4 AVC/264, and lossless codecs, such as a text codec, can be used.

Operation 204 is performed for each region of the received screen content, and corresponds to decompressing the received graphical content into decompressed graphical data. The decompression can be performed, for example, by a programmable circuit 124 or special-purpose programmable circuit 125 of remote device 120. Decompressing the screen content via operation 204 can vary depending upon the codec used to compress the screen content.

Operation 206 includes, in the embodiment shown, selecting one or more filters to apply to the overall decompressed graphical content. This can be accomplished in a number of ways. For example, and as discussed in further detail below, for each region, and based on a compression level associated with that region and the type of content in that region, one or more filters can be selected to be applied to the decompressed graphical content. In some cases, this can be based on the codec applied, since the codec applied defines whether data is transferred in a lossy or lossless format. For example, codecs that utilize a high compression, and hence lower quality, will utilize a first selection of and ordering of filters, while codecs utilizing a lower compression level, and hence having a higher quality, will utilize a second selection and ordering of filters. In some cases, codecs that are lossless or nearly lossless may utilize fewer or no filters.

Operation 208 applies the selected filters to the associated portions of the decompressed graphical content. Based on the selection of filters in operation 206, in some embodiments this can include selective application of one or more filters to some or all of the regions of decompressed graphical content, thereby improving a visual quality of the graphical content when ultimately displayed.

Figure 3:
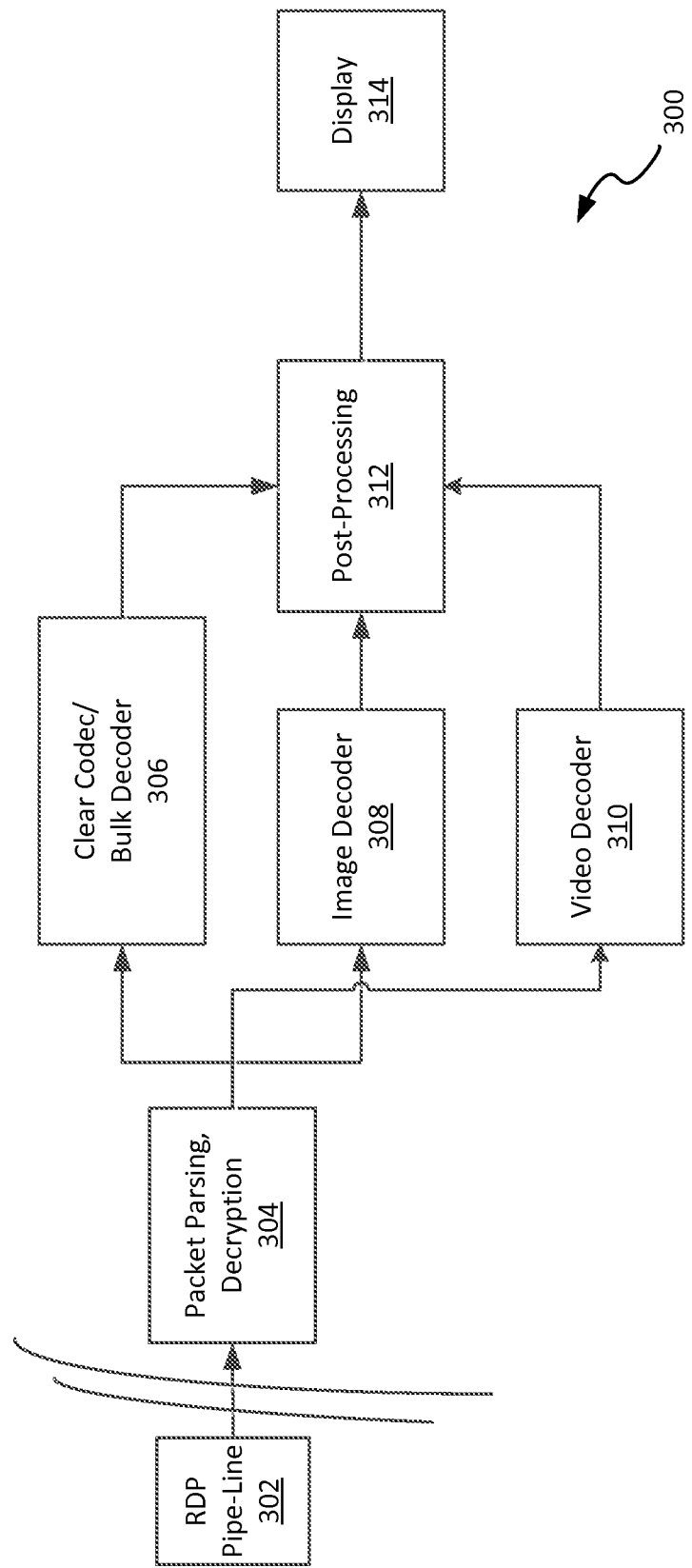
FIG. 3 illustrates a post-processing filter data flow in the context of a remote screen display system of a computing system, according to an example embodiment.

Referring now to FIG. 3, a post-processing filter data flow 300 is shown, in the context of a remote screen display system of a computing system. The data flow 300 as illustrated can be implemented on a computing system receiving graphical content, such as an RDP client. In the embodiment shown, data is received from an RDP pipeline 302 at a packet parsing and decryption component 304. In various embodiments, the RDP pipeline 302 can be located at a remote source, such as an RDP server, or some other computing system (e.g., computing device 102 of FIG. 1). By way of contrast, the packet parsing and decryption component 304 is located at a receiving computing system, such as an RDP client or analogous system, such as remote device 120 of FIG. 1.

The packet parsing and decryption component 304 obtains graphical content that is encoded and optionally encrypted, and generates decrypted content. The packet parsing and decryption component 304 also determines a type of content included in each of a plurality of regions in the graphical content, and routes that content to one of a plurality of decoders, including a clear codec decoder 306, an image decoder 308, and a video decoder 310. The clear codec decoder 306 receives graphical content representing text data, and applies a codec to decode the text data, thereby forming decompressed graphical content for the region of a screen that contains text. Similarly, the image decoder 308 applies a different codec, such as a progressive codec, to decode the image data received from the packet parsing and decryption component 304, thereby forming decompressed graphical content for a different region of the screen that contains image or background data. Additionally, video decoder 310 applies a further codec, such as the MPEG-4 AVC/264 codec, to form decompressed graphical content for a region of the screen containing video content.

From each of the decoders 306-310, decompressed graphical content is routed to a post-processing component 312. The post-processing component 312 applies one or more filters to decompressed graphical content from one or more of the regions of the screen as received from the decoders 306-310. As discussed in further detail below, the post-processing component 312 receives information regarding a quality of the decompressed graphical content, and applies filters according to an amount of compression (and associated quality) of the decompressed graphical content, and associates different filters, or combinations or orders of filters, to regions based on the quality of the content associated with each region. The filters can be applied, for example, using the methodology illustrated in FIG. 4, below. After filters are applied, a display component 314 causes display of the decompressed, filtered graphical content.

Figure 4:
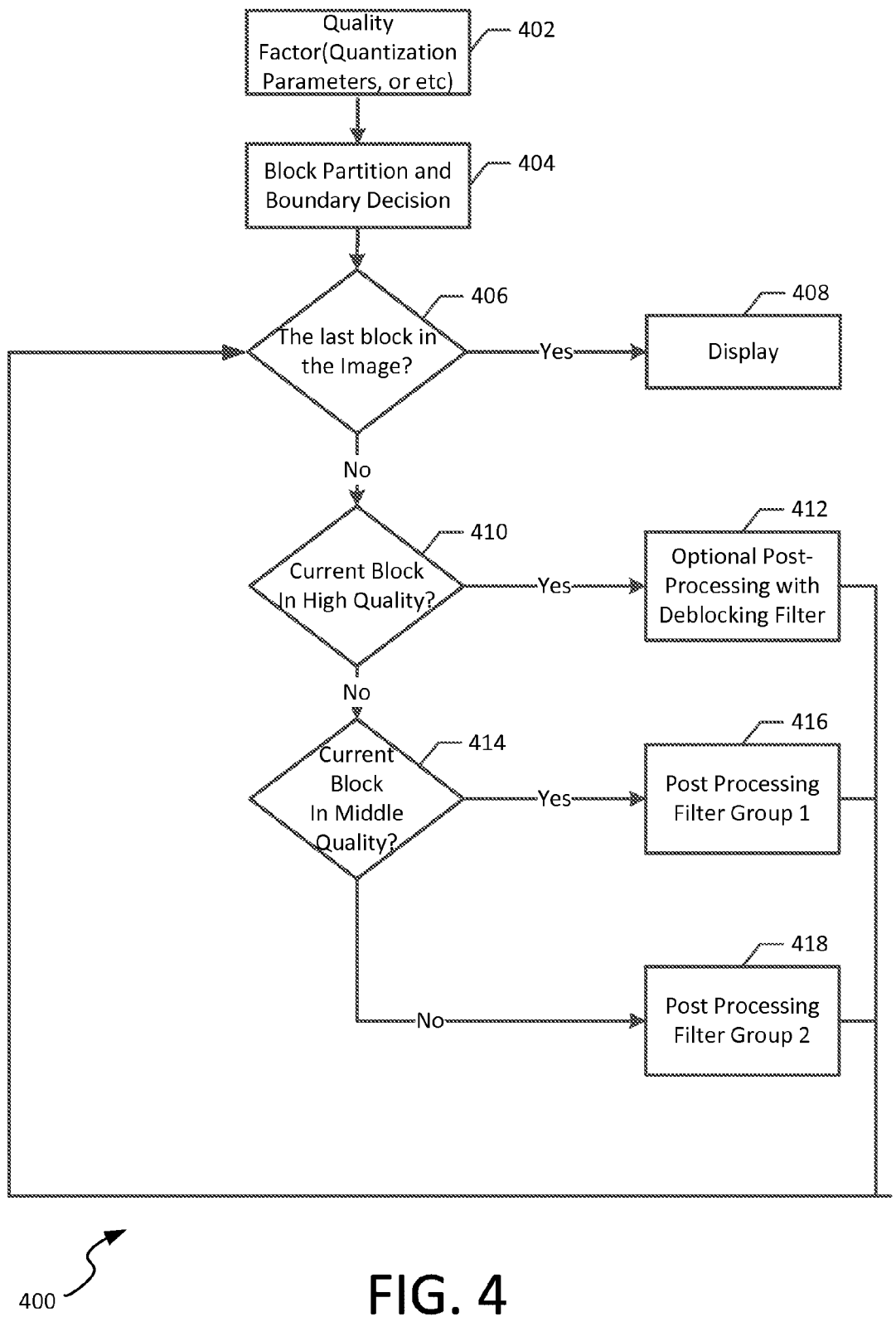
FIG. 4 illustrates a flowchart illustrating a method of post-processing graphical data received from a remote source, according to an example embodiment.

FIG. 4 illustrates a flowchart illustrating a method 400 of post-processing graphical data received from a remote source, according to an example embodiment. In general, the method 400 is performed on decompressed graphical content that is recovered from being encoded and/or compressed. The method 400 is particularly operable in the RDP context, in which display blocks including graphical content are separately received and used for reconstruction of an overall screen image. For example, method 400 can be performed by post-processing component 312 of FIG. 3, above.

At operation 402, a quality factor is determined for each block received for post-processing. The quality factors can be determined in a number of ways. For example, the quality factors can be based on a quantization parameter (QP) that is provided by some codecs, such as MPEG-4/H.264. Alternatively, in the context of a wavelet progressive codec, a quality percentage can be used as a measurement of quality. Each of the quality factors represents an amount of compression, and correspondingly an amount of loss, formed by encoding and decoding graphical data using that codec for the particular graphical content.

Operation 404 corresponds to detecting partitions between blocks, for example based on boundaries between regions of the screen that have been encoded (prior to transmission) and decoded (after transmission) using different codecs. Once the blocks in a screen image are separated, they are each considered to determine whether and what type of post processing filters are to be applied to the graphical content in each block. Operation 406 determines whether all blocks have been considered and processed. If all blocks have been processed, operation 408 proceeds to display the post-processed graphical data from the collection of blocks, thereby presenting a screen image that has been selectively filtered to improve its appearance.

However, if not all blocks have been determined at operation 406, operation 410 determines whether a current block under consideration has a high quality. This assessment can be based on a number of factors, such as the type of content, the codec used to compress that content for transmission from a remote source, a compression ratio or quality percentage (e.g., in the case of progressive encoding), and observed quality factors. It is noted that these features are typically interrelated, in that a particular codec may typically provide a high compression ratio, and will consequently cause greater loss rates and lower quality than a different codec that has a lower compression ratio, lower loss rates, and higher quality. The higher compression may be required for transmitting image or video content, while the lower compression may be able to be used for text content.

If operation 410 determines that a block under consideration is of high quality, operation 412 optionally applies an asymmetric deblocking filter to the block. In an alternative embodiment, since the block may already contain graphical data encoded with a codec that is lossless or near-lossless, no filter might be applied. From operation 408, flow proceeds to selecting a next block in an overall image, and operational flow returns to operation 406.

Figure 6:
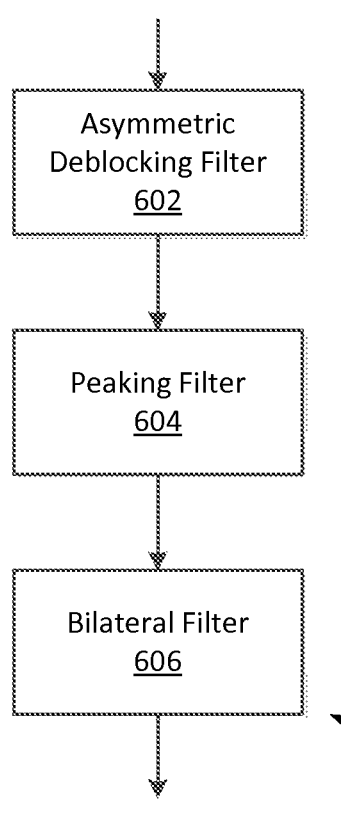
FIG. 6 is a schematic illustration of an example set of post-processing filters useable on graphical content in a region of the screen image of FIG. 5, according to an example embodiment.

If operation 410 determines that the block under consideration is not of high quality, operation 414 determines whether the block is of middle quality or low quality. If the block is of middle quality, operation 416 applies a first plurality of filters in a first order. The first plurality of filters can be, for example, the asymmetric deblocking filter, peaking filter, and bilateral filter as illustrated in FIG. 6, although in alternative embodiments other filter sets or orders of filters could be selected. If the block is of low quality, operation 418 applies a second plurality of filters in a second order. From operations 416 or 418, flow proceeds to selecting a next block in an overall image, and operational flow returns to operation 406.

When comparing operations 416 and 418, as compared to the first plurality of filters, the second plurality of filters may include different filters, or be ordered differently. For example, the second plurality of filters can be, for example, an asymmetric deblocking filter, bilateral filter, and peaking filter of FIG. 7. Accordingly, in such an embodiment, an order of application of filters may vary, although the filters themselves may not vary. However, it is noted that other filters could be used based on a categorization of content quality.

Furthermore, even though the same set of filters may be used in the case of different qualities of the block, it is noted that different parameters could also be used for each filter based on the quality of image or graphical data in the block. Details regarding ways in which such parameters may be varied are discussed in further detail below.

In the context of FIG. 4, each of the operations 410 and 414 can be performed in a number of ways to determine whether a particular block has a high, medium, or low quality. In some embodiments, a table of content types, codecs, and/or image quality can be maintained and accessed by operations 410, 414 to determine if a particular block is of high, medium, or low quality. One example of such a table is illustrated below:

TABLE 1

Example Quality Assessment

| Content Type | Codec | High Quality | Medium Quality | Low Quality |
|---|---|---|---|---|
| Text | Clear | All (Lossless) | N/A | N/A |
| Image | Progressive | QP < 26 | 26 < QP < 35 | QP > 35 |
| Video | MPEG-4/H.264 | QP < 26 (image) QP < 32 (flag) | 26 < QP < 35 (image) 32 < QP < 37 (flag) | QP > 37 |

It is noted that although QP is used as a representation of the compression and quality of particular graphical content, other parameters could be used as well. Additionally, the values in the table can be adaptively adjusted over time as bandwidth between a remote source and a system receiving the graphical content changes.

It is noted that, in some embodiments, the QP values can be obtained from either an encoding side (e.g., from a remote source, such as computing device 102 of FIG. 1, or from a decoder at the receiving computing system (e.g. as may be implemented in programmable circuit 124 or special-purpose programmable circuit 125). Since the QP values are used for decoding at the receiving computing system, they can be made available for post-processing as well.

Figure 5:
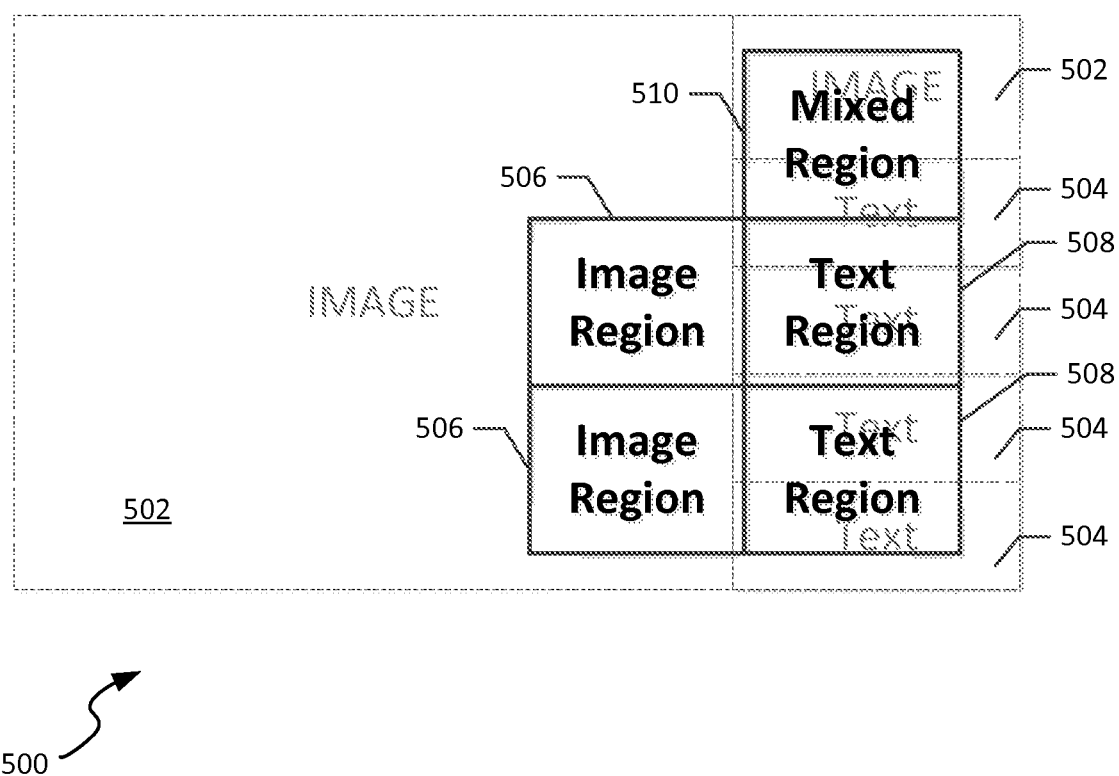
FIG. 5 is a schematic illustration of categorized graphical content included in a screen image, according to an example embodiment.

Referring now to FIG. 5, a schematic illustration of categorized graphical content in a screen image 500 is shown, according to an example embodiment. As seen in FIG. 5, the screen image 500 includes various types of content, such as image content 502 and text content 504. Additionally, the screen image 500, which represents decompressed graphical data reconstructed after being decoded (e.g., received at post-processing component 312), can be examined to determine codec boundaries. Each codec boundary typically is separated according to the regions as characterized during the RDP encoding process. In the embodiment shown, codec boundaries form image regions 506, text regions 508, and mixed region 510. It is recognized that other regions would be included within the screen image 500 as well; these regions are depicted for purposes of illustration.

As noted above, based on the region in which the content resides, the post-processing component 312 can determine a set of one or more filters to optionally apply to that region. Details regarding such filters, and an ordering of filters, are provided below in connection with FIGS. 6-11.

Figure 7:
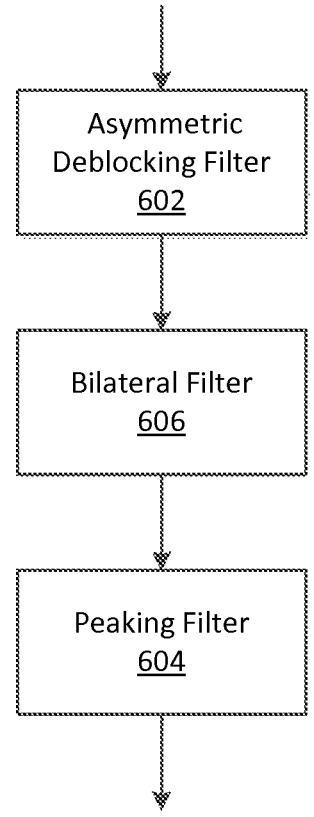
FIG. 7 is a schematic illustration of a second example set of post-processing filters useable on graphical content in a region of the screen image of FIG. 5, according to an example embodiment.

Referring first to FIGS. 6-7, a first filter group 600 and a second filter group 700 are shown. In example embodiments, the first filter group 600 is applied to a middle quality graphical block, while the second filter group is applied to a low quality block (e.g., based on the QP characteristics obtained from an encoding/decoding process, such as in image decoder 308 or video decoder 310, or received from an RDP pipeline 302 at a remote source).

In the embodiments shown, the first filter group 600 includes an asymmetric deblocking filter 602, followed sequentially by a peaking filter 604, which is followed sequentially by a bilateral filter 606. By way of contrast, the second filter group 700 includes the asymmetric deblocking filter 602 followed sequentially by the bilateral filter 606, which is in turn followed by the peaking filter 604. Accordingly, in this embodiment, medium and low quality graphical data is filtered differently in that a different ordering of filters is used.

Generally, the asymmetric deblocking filter 602 is used to remove blocking artifacts, such as in instances where an image is broken into distinct regions, with each region compressed to a different quality. This may occur either by way of a single codec applied differently to different regions, or a set of content-specific codecs. In some embodiments, the asymmetric deblocking filter 602 utilizes a plurality of filter taps across a block to generate a gradient image; the gradient image allows for elimination of sharp "edges" or other edge artifacts along a block. Example implementations of an asymmetric deblocking filter are discussed further below in connection with FIGS. 8-9.

The peaking filter 604 generally is applied to improve a sharpness of an image, for example to improve contrast in the decoded image, some of which is lost in a lossy codec. By way of contrast, the bilateral filter 606 smooths images while preserving edges. This removes quantization noise without blurring edges. Accordingly, for medium quality graphical data, application of the peaking filter 604 before the bilateral filter 606 allows the first filter group 600 to maintain sharpness of that image region. However, for low quality images in which a great deal of noise is present, it is advantageous to apply the bilateral filter 606 prior to the peaking filter 604, to avoid sharpening the noise of a low quality image.

It is noted that, for both filter groups 600, 700, the filters can be applied to graphical data represented in either YUV or RGB space. In some embodiments, the filters are applied in YUV space.

Figure 8:
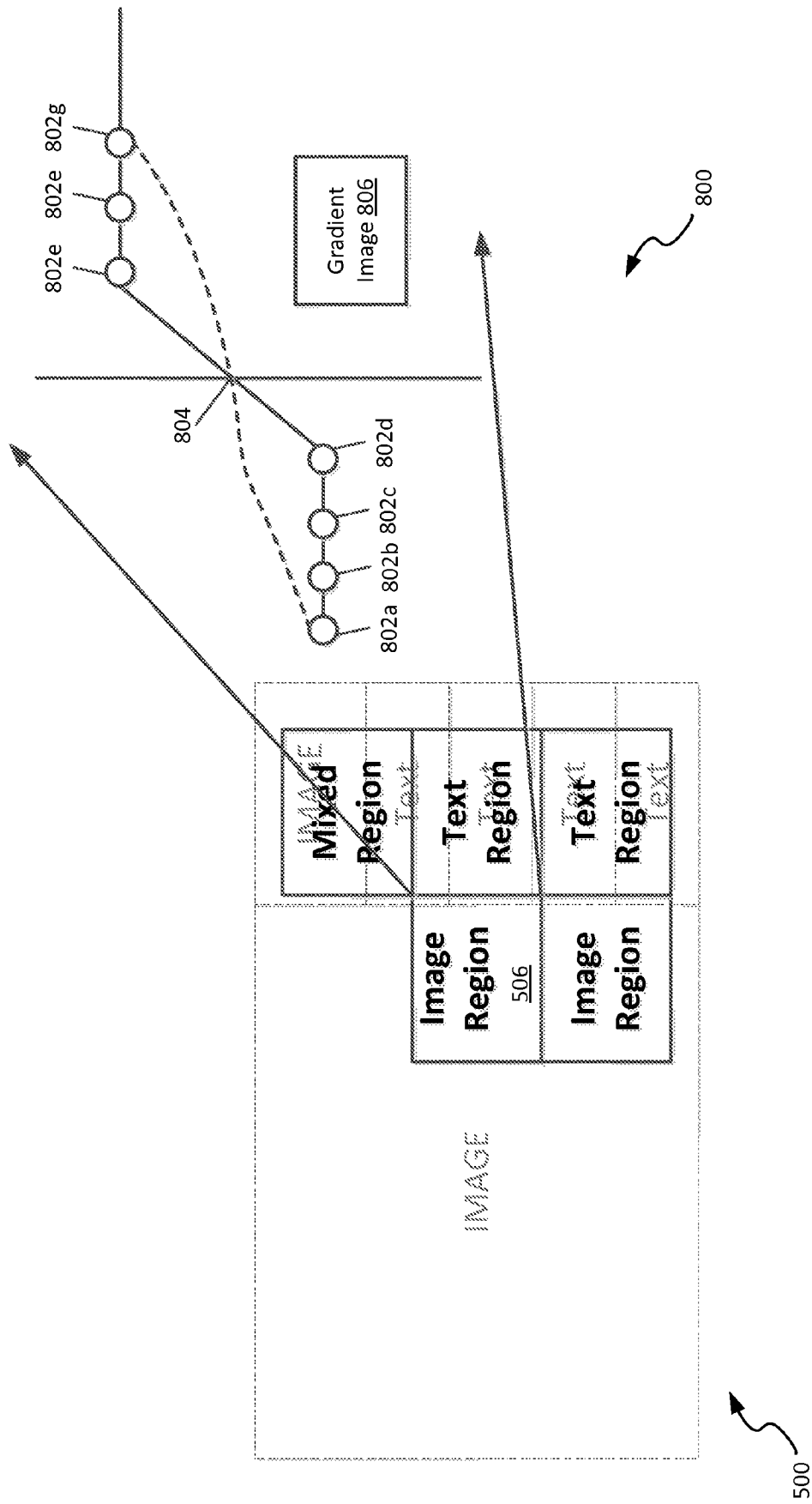
FIG. 8 illustrates application of an asymmetric deblocking filter along a vertical boundary of a decoded block of graphical content included in a screen, according to an example embodiment.
Figure 9:
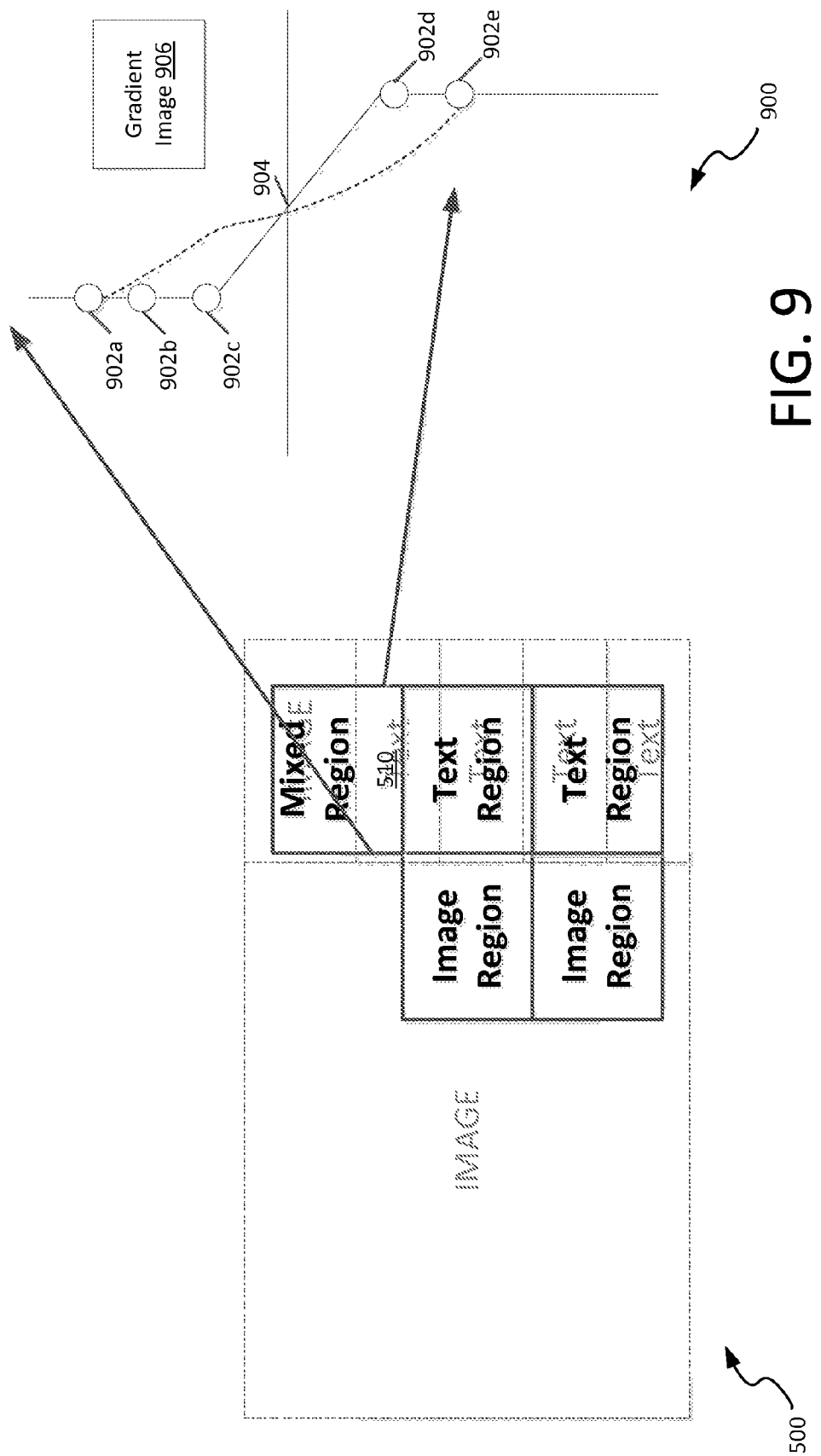
FIG. 9 illustrates application of an asymmetric deblocking filter along a horizontal boundary of a decoded block of graphical content included in a screen, according to an example embodiment.

Referring to FIGS. 8-9, additional details regarding an asymmetric deblocking filter, such as filter 602, are shown. In particular, FIG. 8 provides a schematic representation showing application of an asymmetric deblocking filter 800 along a vertical boundary of a decoded block of graphical content included in a screen image 500. FIG. 9 provides a schematic representation showing application of an asymmetric deblocking filter 900 along a horizontal boundary of a decoded block of graphical content included in screen image 500.

In general, an asymmetric deblocking filter, such as filters 800, 900, utilizes a plurality of filter taps, shown in FIG. 8 as taps 802*a-g*. In the embodiment shown, the filter taps 802*a-g* are asymmetrical in that they are unbalanced about a center point 804 of the asymmetric deblocking filter 800, with four taps 802*a-d* toward a first side of the center, and three taps 802*e-g* toward a second side. Although seven taps are shown in the embodiments of FIGS. 8-9, different numbers of taps could be used in alternative implementations.

As seen in FIG. 8, since the codec used is a lossy codec (e.g., a codec used to encode image data for image region 506), there are more filter taps toward a lossy part of the block as compared to a lossless part of the region, or block. In the embodiment shown, taps 802*a-d* are toward a lossy side of the image region 506, and taps 802*e-g* are toward the lossless part of the image region 506. Additionally, a gradient image 806 can be applied as well, to adjust a strength of the deblocking performed by the filter.

As seen in FIG. 9, in the horizontal boundary of a decoded screen block (e.g., for mixed region 510), a further embodiment of an asymmetric deblocking filter 900 is shown in which filter taps 902*a-e* are unbalanced around a center point 904, with three filter taps 902*a-c* are positioned along a lossy part of the mixed region 510, and two filter taps 902*d-e* are positioned in the lossless part of the region. Again, in alternative embodiments, other numbers of filter taps could be used. Additionally, as with FIG. 8 a gradient image 906 can be applied as well, to adjust a strength of the deblocking performed by the filter.

In general, the asymmetric deblocking filter embodiments of FIGS. 8-9 operate to remove boundary artifacts, which are represented in the displayed screen image as large black lines along an edge of a particular block that has graphical data that was encoded and decoded using a lossy codec. These boundary artifacts are formed by the quantization in the transform domain when the codec is applied. Accordingly, since the text regions 508 are encoded using a lossless codec, there is no downsampling in this case, and no quantization. Accordingly, text regions 508 may not require post-process filtering. However, in some cases, because even text blocks may include some level of chroma downsampling, it may be advantageous to apply an asymmetric deblocking filter, such as asymmetric deblocking filters 602, 800, 900 to text blocks. Further, as noted above, it may be further advantageous to apply such a filter at a pre-processing stage, for example to graphical data before that graphical data is encoded at the remote source.

Figure 10:
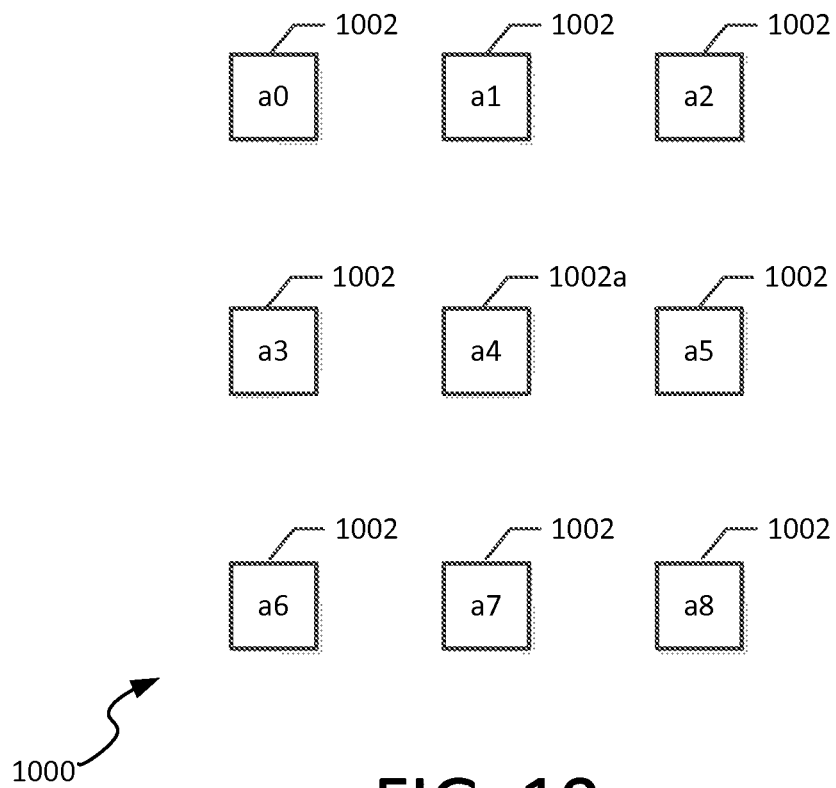
FIG. 10 illustrates a schematic layout of a peaking filter, according to an example embodiment.
Figure 11:
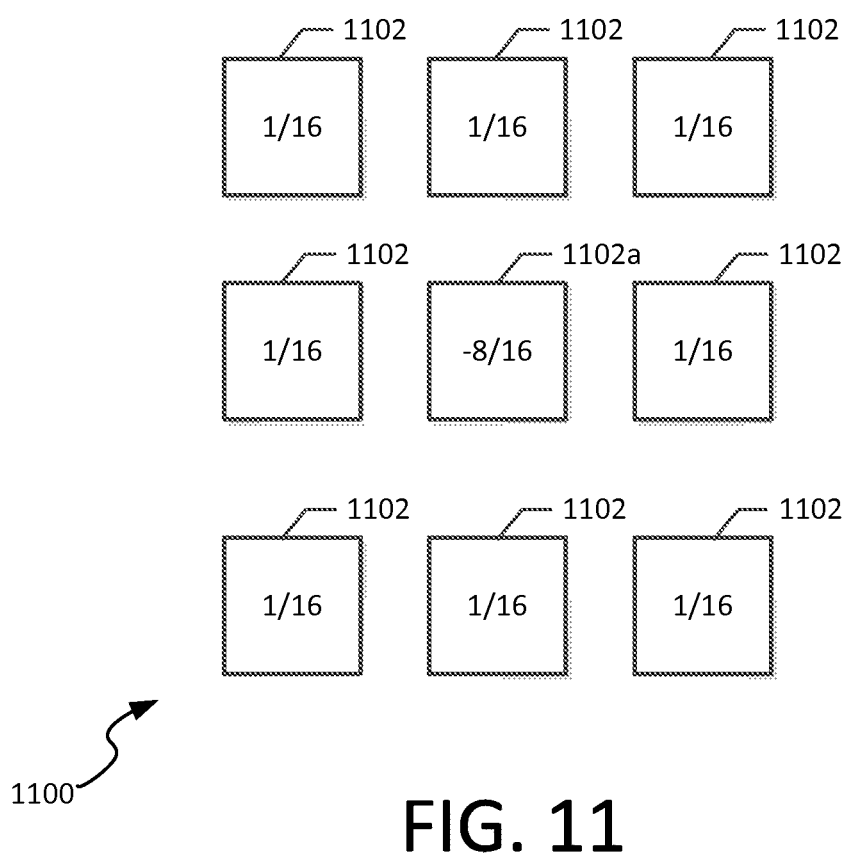
FIG. 11 illustrates an example application of the peaking filter of FIG. 10.

Referring now to FIGS. 10-11, a layout of a peaking filter 1000, and a particular filter bank 1100 used in such a peaking filter are shown. The peaking filter 1000 can, in some embodiments, be used as peaking filter 604 of FIGS. 6-7, and generally provides a high-pass filter arrangement for sharpening an image. Generally, the peaking filter 1000 is applied across a set of neighboring pixels 1002, with a center pixel 1002*a* corresponding to a currently filtered pixel. In general the peaking filter can be defined as follows:

$$\breve{p} = \sum_{k=0}^{9} a_k p[k]$$

$$\text{subj:} \sum_{k=0}^{9} a_k = 1$$

In this arrangement p̆ corresponds to the filter result, with p[k] representing the nine pixels that include a current filtered pixel in the center. In the example definition above, $a_k$ corresponds to the filter taps. The above set of equations results in an edge map, and a resulting value for the center pixel 1002a can be calculated using the edge map as follows:

$$p(\text{center pixel}) = (1 - \text{alpha})p(\text{center pixel}) + \text{alpha}*(\tilde{p})$$

As illustrated in FIG. 11, an example filter bank 1100 is shown as would be applied to such pixels. As seen in FIG. 11, the filter bank 1100 includes filter taps 1102 that are weighted such that the neighboring pixels 1002 are weighted evenly, and compared to the center pixel 1002a. The filter taps 1102 therefore include a center tap 1102a, that has a value equal to a negative sum of the remaining, surrounding filter taps 1102. As noted above, application of this filter generates an edge map that is then added back to the original pixels of the image after being multiplied by an alpha (between 0 and 1), which will control the strength of a sharpening effect to be applied to the image.

It is further noted that, depending upon the quality of image data received, the peaking filter 1000 could be applied differently, even if applied to graphical data or different qualities. For example, the alpha parameter that determines the amount of sharpening to be performed on an image may be varied within a range of values from 0-1, with higher numbers representing a greater sharpening effect.

Referring back to FIGS. 6-7, a bilateral filter 606 can also be applied to the graphical content as discussed above. One example bilateral filter that could be used is a Gaussian filter, which may fit the filter formulation as follows:

$$B((\hat{x}, \hat{y}), \sigma_d, \sigma_r) = \frac{\int e^{-\frac{1}{2}\left(\frac{(x-\hat{x})^2 + (y-\hat{y})^2}{\sigma_d^2}\right)} e^{-\frac{1}{2}\left(\frac{|f(\hat{x},\hat{y}) - f(x,y)|}{\sigma_r}\right)^2} f(x, y) dx dy}{\int e^{-\frac{1}{2}\left(\frac{(x-\hat{x})^2 + (y-\hat{y})^2}{\sigma_d^2}\right)} e^{-\frac{1}{2}\left(\frac{|f(\hat{x},\hat{y}) - f(x,y)|}{\sigma_r}\right)^2} dx dy}$$

In this Gaussian filter definition, $(\hat{x}, \hat{y})$ is a pixel location, $(x, y)$ are neighboring pixels, $\sigma_d$ is related to the blur radius, $\sigma_r$ determines how contrasts will be preserved or blurred, and function $f()$ returns the pixel value. In such embodiments, the value of $\sigma_d$ and $\sigma_r$ are left to be decided in the particular implementation. For $\sigma_d$, if the selected value is too large, features may be blurred across significant boundaries. For $\sigma_r$, if the value is too small, all contrasts will be preserved, leading to a filter that has little effect on the image. In some embodiments of the bilateral filter 606, a tent filter could be used in place of a Gaussian filter to reduce processing time of the filter. Other types of bilateral filters could be used as well.

As is noted above with the peaking filter 1000, the bilateral filter 606 can be applied differently to different types or qualities of graphical data. In particular, parameters and parameter values can vary according to quality of the graphical data, as indicated by the QP values noted above. For example, as illustrated in the equation above, the bilateral filter 606 has domain and range parameters $\sigma_d$ and $\sigma_r$, respectively, that control the strength of the smoothening and edge preservation respectively of the bilateral filter. In addition, in alternative embodiments, the extent of the filter (i.e. the number of taps) can be varied. This would, in essence cause the filter to represent a different filter entirely. In various embodiments, filters with one, five, or nine taps could be used.

An example in which adjustment of filter parameters is applied would be in the case where an image of medium quality may require less smoothing from the bilateral filter than one of a low quality. In fact, excessive smoothing of the medium quality image could be detrimental because it may destroy or attenuate intentional detail and texture in a block. By way of contrast, a low quality block may have artifacts that are not details in the original image and so a higher degree of smoothening should be applied by the bilateral filter.

Figure 12:
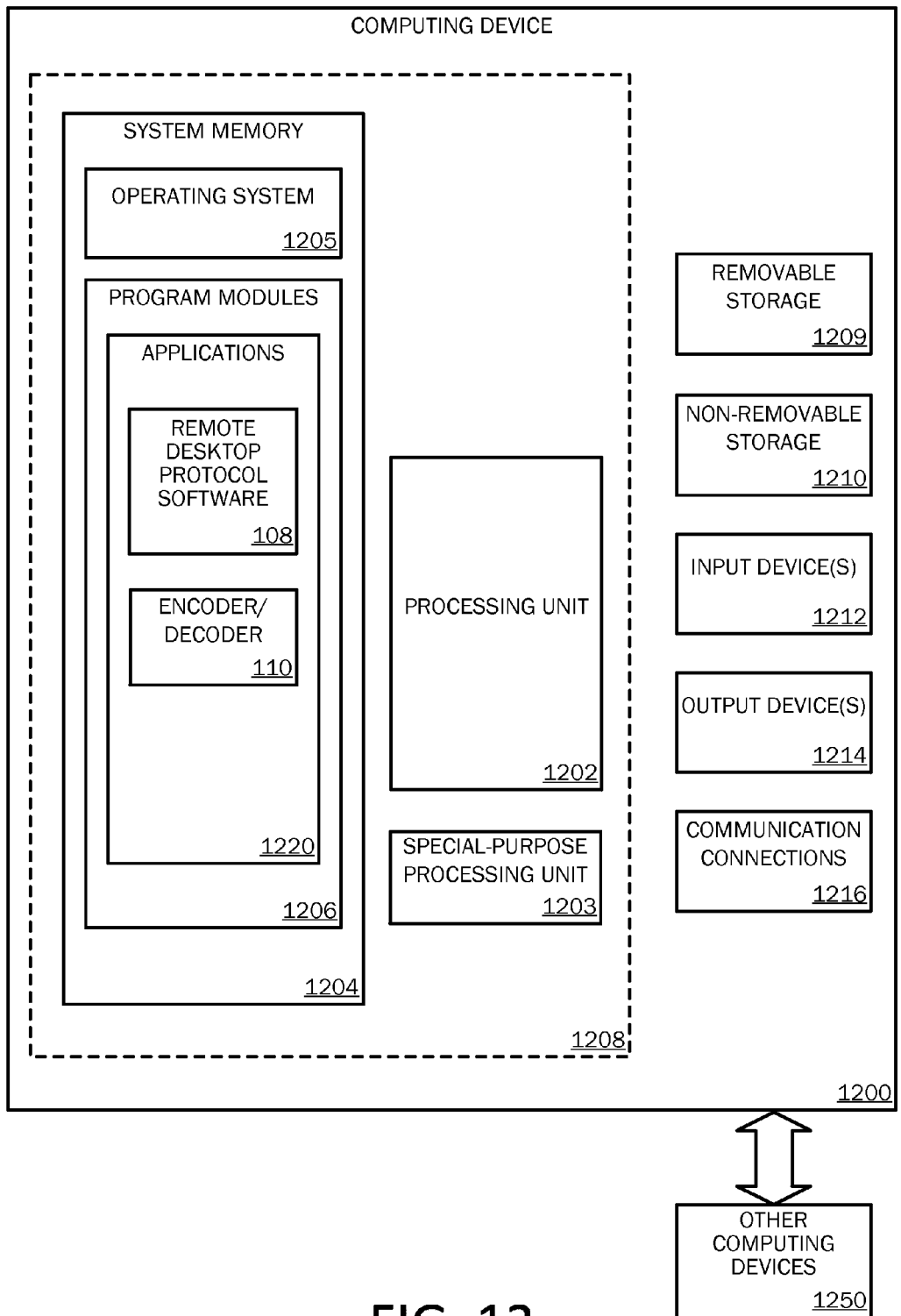
FIG. 12 is a block diagram illustrating example physical components of a computing device with which embodiments of the invention may be practiced.
Figure 13A:
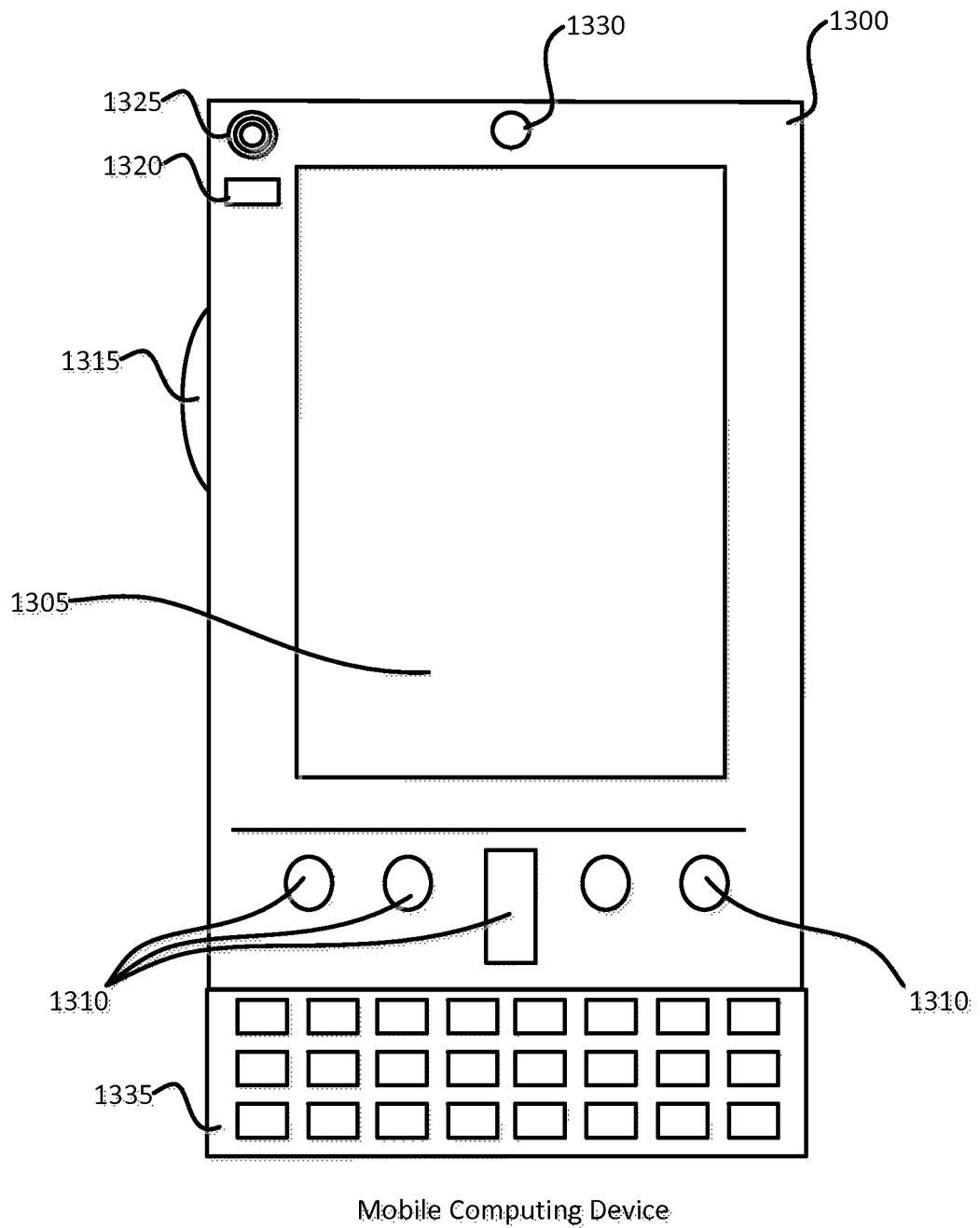
FIGS. 13A and 13B are simplified block diagrams of a mobile computing device with which embodiments of the present invention may be practiced.
Figure 13B:
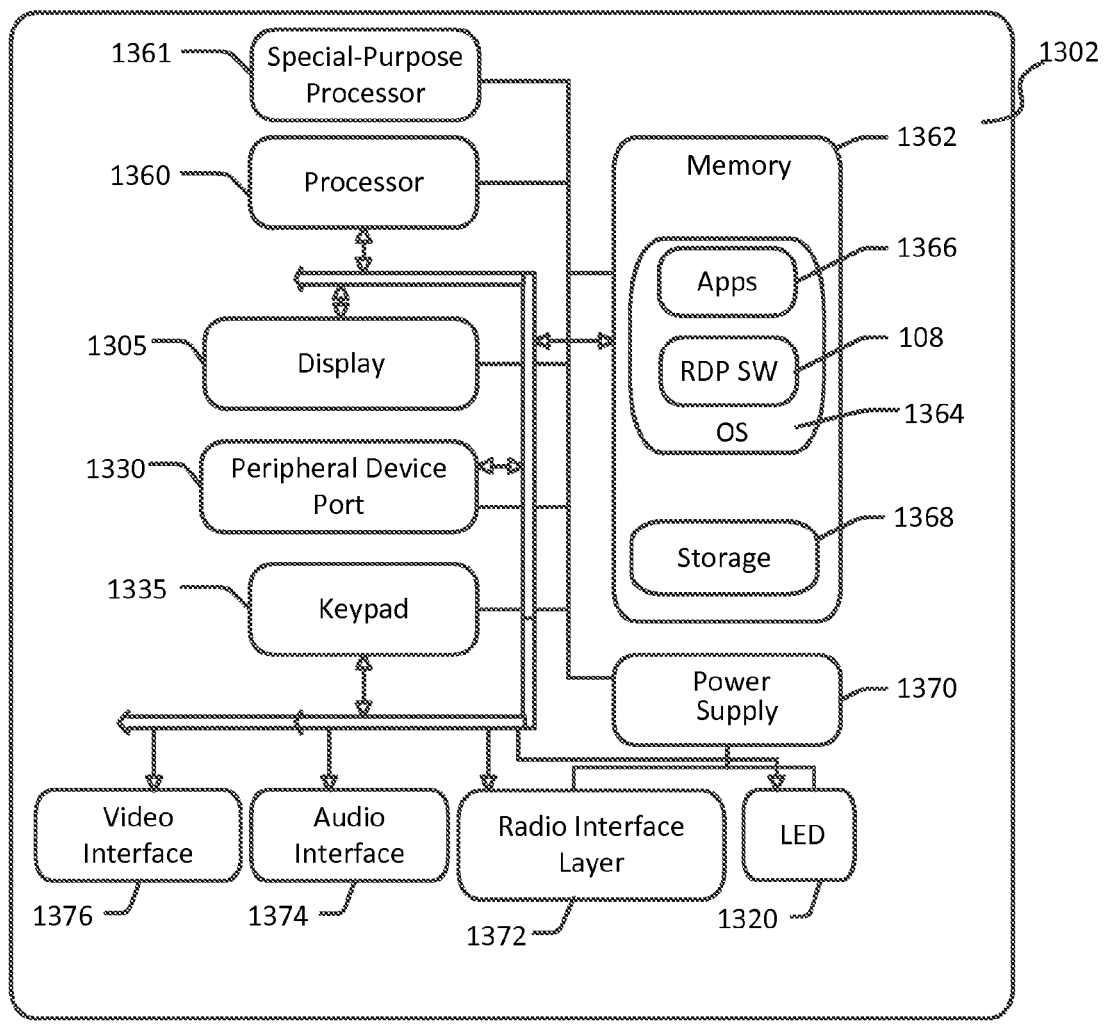
Figure 14:
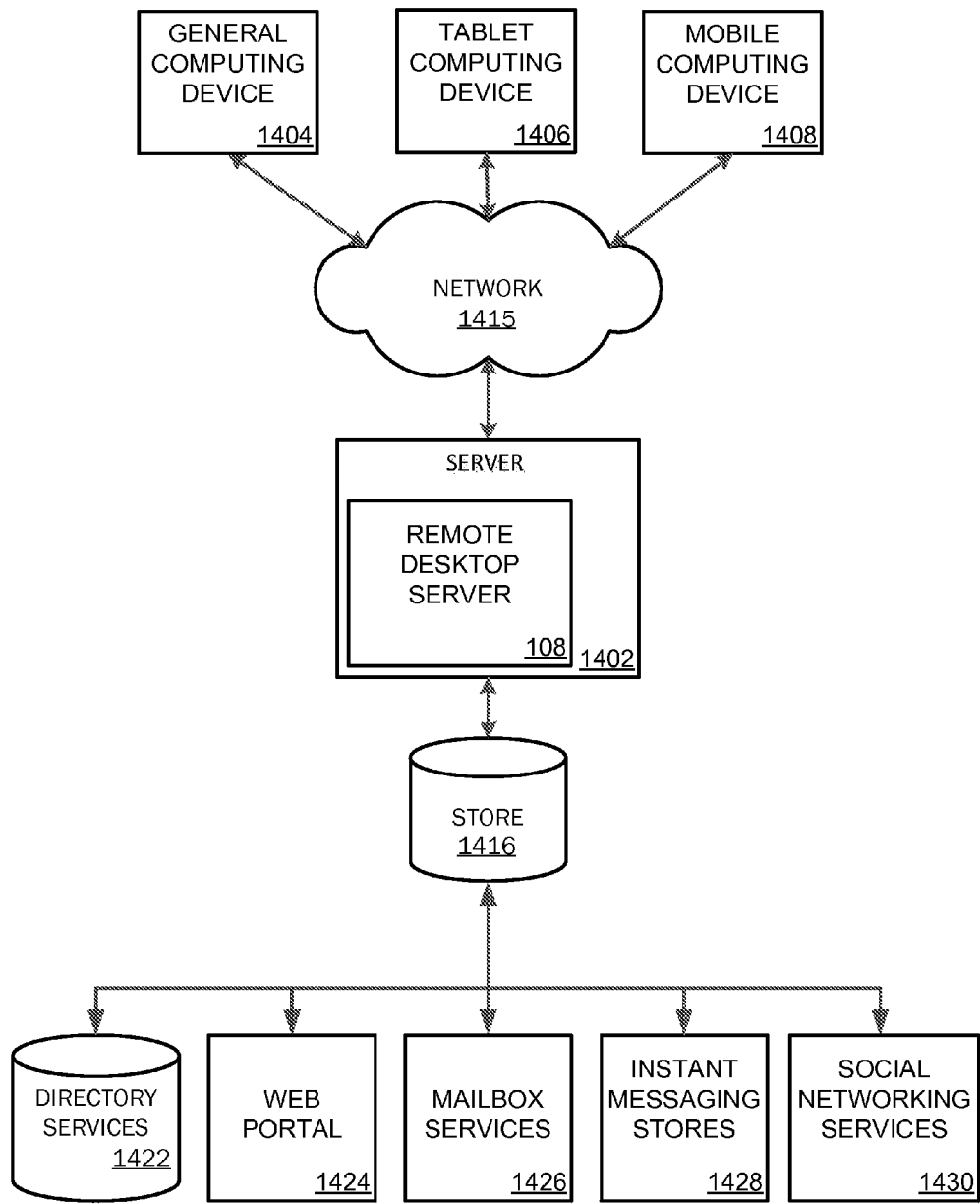
FIG. 14 is a simplified block diagram of a distributed computing system in which embodiments of the present invention may be practiced.

FIGS. 12-14 and the associated descriptions provide a discussion of a variety of operating environments in which embodiments of the invention may be practiced. However, the devices and systems illustrated and discussed with respect to FIGS. 12-14 are for purposes of example and illustration and are not limiting of a vast number of computing device configurations that may be utilized for practicing embodiments of the invention, described herein.

FIG. 12 is a block diagram illustrating physical components (i.e., hardware) of a computing device 1200 with which embodiments of the invention may be practiced. The computing device components described below may be suitable for the computing devices described above. In a basic configuration, the computing device 1200 may include at least one processing unit 1202 and a system memory 1204. Depending on the configuration and type of computing device, the system memory 1204 may comprise, but is not limited to, volatile storage (e.g., random access memory), non-volatile storage (e.g., read-only memory), flash memory, or any combination of such memories. The system memory 1204 may include an operating system 1205 and one or more program modules 1206 suitable for running software applications 1220 such as the remote desktop protocol software 108 and video encoder 110 discussed above in connection with FIG. 1, as well as the associated post-processing discussed throughout FIGS. 2-11. The operating system 1205, for example, may be suitable for controlling the operation of the computing device 1200. Furthermore, embodiments of the invention may be practiced in conjunction with a graphics library, other operating systems, or any other application program and is not limited to any particular application or system. This basic configuration is illustrated in FIG. 12 by those components within a dashed line 1208. The computing device 1200 may have additional features or functionality. For example, the computing device 1200 may also include additional data storage devices (removable and/or non-removable) such as, for example, magnetic disks, optical disks, or tape. Such additional storage is illustrated in FIG. 12 by a removable storage device 1209 and a non-removable storage device 1210.

As stated above, a number of program modules and data files may be stored in the system memory 1204. While executing on the processing unit 1202, the program modules 1206 (e.g., remote desktop protocol software 108 and video encoder 110) may perform processes including, but not limited to, one or more of the stages of the method 200 illustrated in FIG. 2, or method 400 of FIG. 4. Accordingly, the program modules 1206 can incorporate or embody any of the filters discussed herein. Other program modules that may be used in accordance with embodiments of the present invention, and in particular to generate screen content, may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 12 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the remote desktop protocol software 108 and video encoder 110 may be operated via application-specific logic integrated with other components of the computing device 1200 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1200 may also have one or more input device(s) 1212 such as a keyboard, a mouse, a pen, a sound or voice input device, a touch or gesture input device, etc. The output device(s) 1214 such as a display, speakers, a printer, etc. may also be included. The aforementioned devices are examples and others may be used. The computing device 1200 may include one or more communication connections 1216 allowing communications with other computing devices 1218. Examples of suitable communication connections 1216 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1204, the removable storage device 1209, and the non-removable storage device 1210 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1200. Any such computer storage media may be part of the computing device 1200. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 13A and 13B illustrate a mobile computing device 1300, for example, a mobile telephone, a smart phone, a tablet personal computer, a laptop computer, and the like, with which embodiments of the invention may be practiced. With reference to FIG. 13A, one embodiment of a mobile computing device 1300 for implementing the embodiments is illustrated. In a basic configuration, the mobile computing device 1300 is a handheld computer having both input elements and output elements. The mobile computing device 1300 typically includes a display 1305 and one or more input buttons 1310 that allow the user to enter information into the mobile computing device 1300. The display 1305 of the mobile computing device 1300 may also function as an input device (e.g., a touch screen display). If included, an optional side input element 1315 allows further user input. The side input element 1315 may be a rotary switch, a button, or any other type of manual input element. In alternative embodiments, mobile computing device 1300 may incorporate more or less input elements. For example, the display 1305 may not be a touch screen in some embodiments. In yet another alternative embodiment, the mobile computing device 1300 is a portable phone system, such as a cellular phone. The mobile computing device 1300 may also include an optional keypad 1335. Optional keypad 1335 may be a physical keypad or a "soft" keypad generated on the touch screen display. In various embodiments, the output elements include the display 805 for showing a graphical user interface (GUI), a visual indicator 1320 (e.g., a light emitting diode), and/or an audio transducer 1325 (e.g., a speaker). In some embodiments, the mobile computing device 1300 incorporates a vibration transducer for providing the user with tactile feedback. In yet another embodiment, the mobile computing device 1300 incorporates input and/or output ports, such as an audio input (e.g., a microphone jack), an audio output (e.g., a headphone jack), and a video output (e.g., a HDMI port) for sending signals to or receiving signals from an external device.

FIG. 13B is a block diagram illustrating the architecture of one embodiment of a mobile computing device. That is, the mobile computing device 1300 can incorporate a system (i.e., an architecture) 1302 to implement some embodiments. In one embodiment, the system 802 is implemented as a "smart phone" capable of running one or more applications (e.g., browser, e-mail, calendaring, contact managers, messaging clients, games, and media clients/players). In some embodiments, the system 1302 is integrated as a computing device, such as an integrated personal digital assistant (PDA) and wireless phone.

One or more application programs 1366 may be loaded into the memory 1362 and run on or in association with the operating system 1364. Examples of the application programs include phone dialer programs, e-mail programs, personal information management (PIM) programs, word processing programs, spreadsheet programs, Internet browser programs, messaging programs, and so forth. The system 1302 also includes a non-volatile storage area 1368 within the memory 1362. The non-volatile storage area 1368 may be used to store persistent information that should not be lost if the system 1302 is powered down. The application programs 1366 may use and store information in the non-volatile storage area 1368, such as e-mail or other messages used by an e-mail application, and the like. A synchronization application (not shown) also resides on the system 1302 and is programmed to interact with a corresponding synchronization application resident on a host computer to keep the information stored in the non-volatile storage area 1368 synchronized with corresponding information stored at the host computer. As should be appreciated, other applications may be loaded into the memory 1362 and run on the mobile computing device 1300, including the remote desktop protocol software 108 (and/or optionally video encoder 110, or device 120) described herein.

The system 1302 has a power supply 1370, which may be implemented as one or more batteries. The power supply 1370 might further include an external power source, such as an AC adapter or a powered docking cradle that supplements or recharges the batteries.

The system 1302 may also include a radio 1372 that performs the function of transmitting and receiving radio frequency communications. The radio 1372 facilitates wireless connectivity between the system 1302 and the "outside world," via a communications carrier or service provider. Transmissions to and from the radio 1372 are conducted under control of the operating system 1364. In other words, communications received by the radio 1372 may be disseminated to the application programs 1366 via the operating system 1364, and vice versa.

The visual indicator 1320 may be used to provide visual notifications, and/or an audio interface 1374 may be used for producing audible notifications via the audio transducer 1325. In the illustrated embodiment, the visual indicator 1320 is a light emitting diode (LED) and the audio transducer 1325 is a speaker. These devices may be directly coupled to the power supply 1370 so that when activated, they remain on for a duration dictated by the notification mechanism even though the processor 1360 and other components might shut down for conserving battery power. The LED may be programmed to remain on indefinitely until the user takes action to indicate the powered-on status of the device. The audio interface 1374 is used to provide audible signals to and receive audible signals from the user. For example, in addition to being coupled to the audio transducer 1325, the audio interface 1374 may also be coupled to a microphone to receive audible input, such as to facilitate a telephone conversation. In accordance with embodiments of the present invention, the microphone may also serve as an audio sensor to facilitate control of notifications, as will be described below. The system 1302 may further include a video interface 1376 that enables an operation of an on-board camera 1330 to record still images, video stream, and the like.

A mobile computing device 1300 implementing the system 1302 may have additional features or functionality. For example, the mobile computing device 1300 may also include additional data storage devices (removable and/or non-removable) such as, magnetic disks, optical disks, or tape. Such additional storage is illustrated in FIG. 13B by the non-volatile storage area 1368.

Data/information generated or captured by the mobile computing device 1300 and stored via the system 1302 may be stored locally on the mobile computing device 1300, as described above, or the data may be stored on any number of storage media that may be accessed by the device via the radio 1372 or via a wired connection between the mobile computing device 1300 and a separate computing device associated with the mobile computing device 1300, for example, a server computer in a distributed computing network, such as the Internet. As should be appreciated such data/information may be accessed via the mobile computing device 1300 via the radio 1372 or via a distributed computing network. Similarly, such data/information may be readily transferred between computing devices for storage and use according to well-known data/information transfer and storage means, including electronic mail and collaborative data/information sharing systems.

FIG. 14 illustrates one embodiment of the architecture of a system for processing graphical data received at a computing system from a remote source, as described above. Content displayed at server device 1402 may be stored in different communication channels or other storage types. For example, various documents may be stored using a directory service 1422, a web portal 1424, a mailbox service 1426, an instant messaging store 1428, or a social networking site 1430. The remote desktop protocol software 108 may generate RDP-compliant, MPEG-compliant (or other standards-compliant) data streams for display at a remote system, for example over the web, e.g., through a network 1415. By way of example, the client computing device may be implemented as the computing device 102 or remote device 120 and embodied in a personal computer 1404, a tablet computing device 1406 and/or a mobile computing device 1408 (e.g., a smart phone). Any of these embodiments of the computing device 102, 120, 1200, 1300, 1406, 1408 may obtain content from the store 1416, in addition to receiving graphical data useable to be either pre-processed at a graphic-originating system, or post-processed at a receiving computing system.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A method of processing graphical data received at a computing system from a remote source, the method comprising:
   decoding received graphical content, the received graphical content including an image being compressed using a plurality of codecs, wherein decoding the received graphical content includes creating a decoded image including a plurality of image blocks and a plurality of regions, each region independently associated with one of the plurality of codecs;
   for each image block of the plurality of image blocks that includes a region associated with a lossy codec:
      determining a quality factor, corresponding to an amount of loss of data due to compression, for the image block;
      detecting partitions between the image block and adjacent image blocks based on boundaries between regions in the screen image;
      based on the quality factor of the received graphical content in the image block, selecting from among a plurality of filters to apply to the image block; and
      applying one or more filters of the plurality of filters to the image block.

2. The method of claim 1, wherein the plurality of filters includes one or more of a deblocking filter, a bilateral filter, and a peaking filter.

3. The method of claim 1, wherein, for at least one of the plurality of regions encoded using a lossless codec, no filter is applied.

4. The method of claim 1, wherein the plurality of filters includes an asymmetric deblocking filter.

5. The method of claim 1, wherein the method includes, for a first image block of the plurality of image blocks including a region having a compression within a first threshold, applying a plurality of filters to the first image block in a first order and, for a second image block of the plurality of image blocks including a region having a compression within a second threshold, applying the plurality of filters in a second order, the second threshold different from the first threshold and the second order different from the first order.

6. The method of claim 5, wherein the first threshold is provided by a first codec providing a high compression rate, and the second threshold is provided by a second codec providing a medium compression rate.

7. The method of claim 6, wherein the first order comprises sequentially applying a deblocking filter, a bilateral filter, and a peaking filter, and wherein the second order comprises sequentially applying a deblocking filter, a peaking filter, and a bilateral filter.

8. The method of claim 7, wherein in the first order a first set of filter parameters are applied by the bilateral filter, and in the second order a second set of filter parameters are applied by the bilateral filter.

9. The method of claim 7, wherein in the first order a first set of filter parameters are applied by the peaking filter and in the second order a second set of filter parameters are applied by the peaking filter.

10. The method of claim 6, wherein the first and second thresholds are defined in a table of quantization parameters (QP).

11. The method of claim 1, further comprising encoding and transmitting graphical content from the remote source to the computing system, thereby providing received graphical content at the computing system.

12. The method of claim 11, further comprising applying a deblocking filter to the graphical content at the remote source prior to encoding and transmitting the graphical data.

13. A computing system comprising:
a programmable circuit;
a display;
a memory operatively connected to the programmable circuit and storing program instructions which, when executed by the programmable circuit, perform a method of processing graphical data from a remote source for output to the display, the method comprising:
decoding received graphical content, the received graphical content including an image compressed using a plurality of codecs, wherein decoding the received graphical content includes creating a decoded image including a plurality of image blocks and a plurality of regions, each region independently associated with one of the plurality of codecs;
for each image block of the plurality of image blocks that includes a region associated with a lossy codec:
determining a quality factor, corresponding to an amount of loss of data due to compression, for the image block;
detecting partitions between the image block and adjacent image blocks based on boundaries between regions in the screen image;
based on the quality factor of the received graphical content in the image block, selecting from among a plurality of filters to apply to the image block; and
applying one or more filters of the plurality of filters to the image block, the one or more filters including an asymmetric deblocking filter.

14. The computing system of claim 13, where each region has an associated content type and codec selected from among the plurality of codecs.

15. The computing system of claim 14, wherein the associated content type is at least one of a text type, an image type, and a video type.

16. The computing system of claim 13, wherein the asymmetric deblocking filter includes a plurality of filter taps, wherein the plurality of filter taps are disposed across an image region in an unbalanced arrangement around a center point.

17. The computing system of claim 13, wherein the one or more filters further includes a peaking filter and a bilateral filter, wherein the peaking filter is categorized by the following equation:

$$\bar{p} = \sum_{k=0}^{9} a_k p[k]$$

$$\text{subj:} \sum_{k=0}^{9} a_k = 1$$

and wherein the bilateral filter is defined by:

$$B((\hat{x}, \hat{y}), \sigma_d, \sigma_r) = \frac{\int e^{-\frac{1}{2}\left(\frac{(x-\hat{x})^2+(y-\hat{y})^2}{\sigma_d^2}\right)} e^{-\frac{1}{2}\left(\frac{|f(\hat{x},\hat{y})-f(x,y)|}{\sigma_r}\right)^2} f(x, y) dx dy}{\int e^{-\frac{1}{2}\left(\frac{(x-\hat{x})^2+(y-\hat{y})^2}{\sigma_d^2}\right)} e^{-\frac{1}{2}\left(\frac{|f(\hat{x},\hat{y})-f(x,y)|}{\sigma_r}\right)^2} dx dy}.$$

18. A computer-readable storage device comprising computer-executable instructions stored thereon, which, when executed, cause a computing system to perform a method of processing graphical data from a remote source for output to the display, the method comprising:
decoding received graphical content, the received graphical content including an image having a plurality of regions, each region categorized as having graphical content selected from among a plurality of content types, each content type associated with a different codec from among a plurality of codecs, wherein decoding the received graphical content includes creating a decoded image; and
for each region associated with a lossy codec among the plurality of different codecs:
based on quality and compression rate of the received graphical content associated with the region, selecting an ordering of one or more filters from among as defined by a quantization parameter associated with the received graphical content a plurality of filters to apply to the region of the decoded image; and
applying the selected ordering of one or more filters to the region, the one or more filters including an asymmetric deblocking filter, a peaking filter, and a bilateral filter, wherein the peaking filter is categorized by the following equation:

$$\check{p} = \sum_{k=0}^{9} a_k p[k]$$

$$\text{subj: } \sum_{k=0}^{9} a_k = 1$$

and wherein the bilateral filter is defined by:

$$B((\hat{x}, \hat{y}), \sigma_d, \sigma_r) = \frac{\int e^{-\frac{1}{2}\left(\frac{(x-\hat{x})^2+(y-\hat{y})^2}{\sigma_d^2}\right)} e^{-\frac{1}{2}\left(\frac{|f(\hat{x},\hat{y})-f(x,y)|}{\sigma_r}\right)^2} f(x, y) dx dy}{\int e^{-\frac{1}{2}\left(\frac{(x-\hat{x})^2+(y-\hat{y})^2}{\sigma_d^2}\right)} e^{-\frac{1}{2}\left(\frac{|f(\hat{x},\hat{y})-f(x,y)|}{\sigma_r}\right)^2} dx dy}.$$

\* \* \* \* \*